United States Patent
Ling et al.

(10) Patent No.: US 8,615,447 B1
(45) Date of Patent: Dec. 24, 2013

(54) DISTINGUISHING SEARCH RESULTS ASSOCIATED WITH AN ELECTRONIC COMMERCE SYSTEM

(75) Inventors: Benjamin Chan-Bin Ling, San Jose, CA (US); Wendy Tobagus, Mountain View, CA (US); Robert Brown, New York, NY (US); Eric Lange, San Francisco, CA (US); Adam Douglas Smith, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/571,886

(22) Filed: Aug. 10, 2012

Related U.S. Application Data (60) Division of application No. 13/296,217, filed on Nov. 14, 2011, now Pat. No. 8,335,726, which is a continuation of application No. 11/858,096, filed on Sep. 19, 2007, now Pat. No. 8,078,497.

(60) Provisional application No. 60/826,520, filed on Sep. 21, 2006.

(51) Int. Cl.
    *G06Q 30/00* (2012.01)
(52) U.S. Cl.
    USPC .......................................................... 705/26.1
(58) Field of Classification Search
    USPC .......................................................... 705/26.1
    See application file for complete search history.

(56) References Cited

U.S. PATENT DOCUMENTS

| | | |
|---|---|---|
| 2003/0135432 A1 | 7/2003 | McIntyre et al. |
| 2004/0044624 A1 | 3/2004 | Katou et al. |
| 2005/0108125 A1* | 5/2005 | Goodwin et al. ............... 705/35 |
| 2006/0224398 A1 | 10/2006 | Lakshman et al. |
| 2007/0083523 A1 | 4/2007 | Gerard et al. |
| 2007/0130109 A1* | 6/2007 | King et al. ......................... 707/2 |
| 2007/0174144 A1 | 7/2007 | Borders et al. |
| 2008/0071638 A1 | 3/2008 | Wanker |
| 2008/0270209 A1 | 10/2008 | Mauseth et al. |
| 2009/0138441 A1* | 5/2009 | Valentine et al. ................. 707/3 |
| 2009/0144070 A1 | 6/2009 | Psota et al. |
| 2010/0274609 A1 | 10/2010 | Shoemaker et al. |

FOREIGN PATENT DOCUMENTS

KR   10-2009-0000700 A   1/2009

OTHER PUBLICATIONS

PCT International Search Report and Written Opinion, PCT Application No. PCT/US2012/041419, Sep. 24, 2012, 7 pages.

* cited by examiner

*Primary Examiner* — Mila Airapetian
(74) *Attorney, Agent, or Firm* — Fenwick & West LLP

(57) ABSTRACT

A search engine communicates with a broker to identify search result content associated with merchants that support purchases through an electronic commerce system provided by the broker. The results of a search can include some content associated with merchants that support purchases through the broker, some content associated with merchants that do not support purchases through the broker, and some content not associated with any merchant. The search engine visually distinguishes content in the search results associated with merchants that support purchases through the broker by displaying a badge, such as a graphical icon, with the content. The search engine can use different types of badges to indicate different characteristics of the merchants.

20 Claims, 9 Drawing Sheets

DISTINGUISHING SEARCH RESULTS ASSOCIATED WITH AN ELECTRONIC COMMERCE SYSTEM

CROSS-REFERENCE TO RELATED APPLICATIONS

This application is a divisional of prior application Ser. No. 13/296,217, filed Nov. 14, 2011, which is a continuation of U.S. patent application Ser. No. 11/858,096, filed Sep. 19, 2007, which claims the benefit of U.S. Provisional Application No. 60/826,520, filed Sep. 21, 2006, all of which are incorporated herein.

BACKGROUND OF THE INVENTION

1. Field of the Invention

This invention pertains in general to electronic commerce and in particular to identifying merchants participating in an electronic commerce system.

2. Description of the Related Art

Electronic commerce on the Internet has become commonplace. There are many merchants offering goods and services via web sites on the Internet, and there are an even greater number of customers who purchase the goods and services. In many cases, the electronic commerce transactions involve physical goods. For example, many customers purchase items such as books, compact disks (CDs) and DVDs via the Internet. Customers can also purchase electronic content such as downloadable text and/or music and access to web sites that provide news or entertainment stories.

Most electronic commerce sites on the Internet use ad hoc purchasing systems. For example, a web-based music merchant typically has a purchasing system that is valid for only that merchant's family of web sites. Therefore, a customer must establish an account and/or provide payment information to each merchant that the customer patronizes. These separate accounts are inconvenient to both parties. The merchant must maintain a dedicated account management and payment system. The customer must establish separate accounts with numerous merchants.

Due to these inconveniences, customers are often reluctant to purchase items from smaller or relatively unknown merchants. These merchants lack the brand recognition and trust associated with larger, better known merchants. Therefore, the customers hesitate to engage in risky behavior, such as providing a credit card number or shipping address, to the merchants. As a result, there is a need in the art for a way to alleviate these concerns.

BRIEF SUMMARY OF THE INVENTION

The above and other needs are met by a method, computer program product, and computer-implemented system that distinguish search results associated with an electronic commerce system. Embodiments of the method comprise identifying search result content generated responsive to a search query, identifying merchant content within the search result content, the merchant content associated with a merchant that uses the electronic commerce system, and generating a display of the search result content, the display visually distinguishing the merchant content associated with the merchant that uses the electronic commerce system from other search result content.

Embodiments of the computer program product and computer-implemented system comprise a badge determination module configured to identify merchant content within search result content, the merchant content associated with a merchant that uses the electronic commerce system and a badge generation module configured to generate a display of the search result content, the display visually distinguishing the merchant content associated with the merchant that uses the electronic commerce system from other search result content.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

I. Overview

Figure 1:
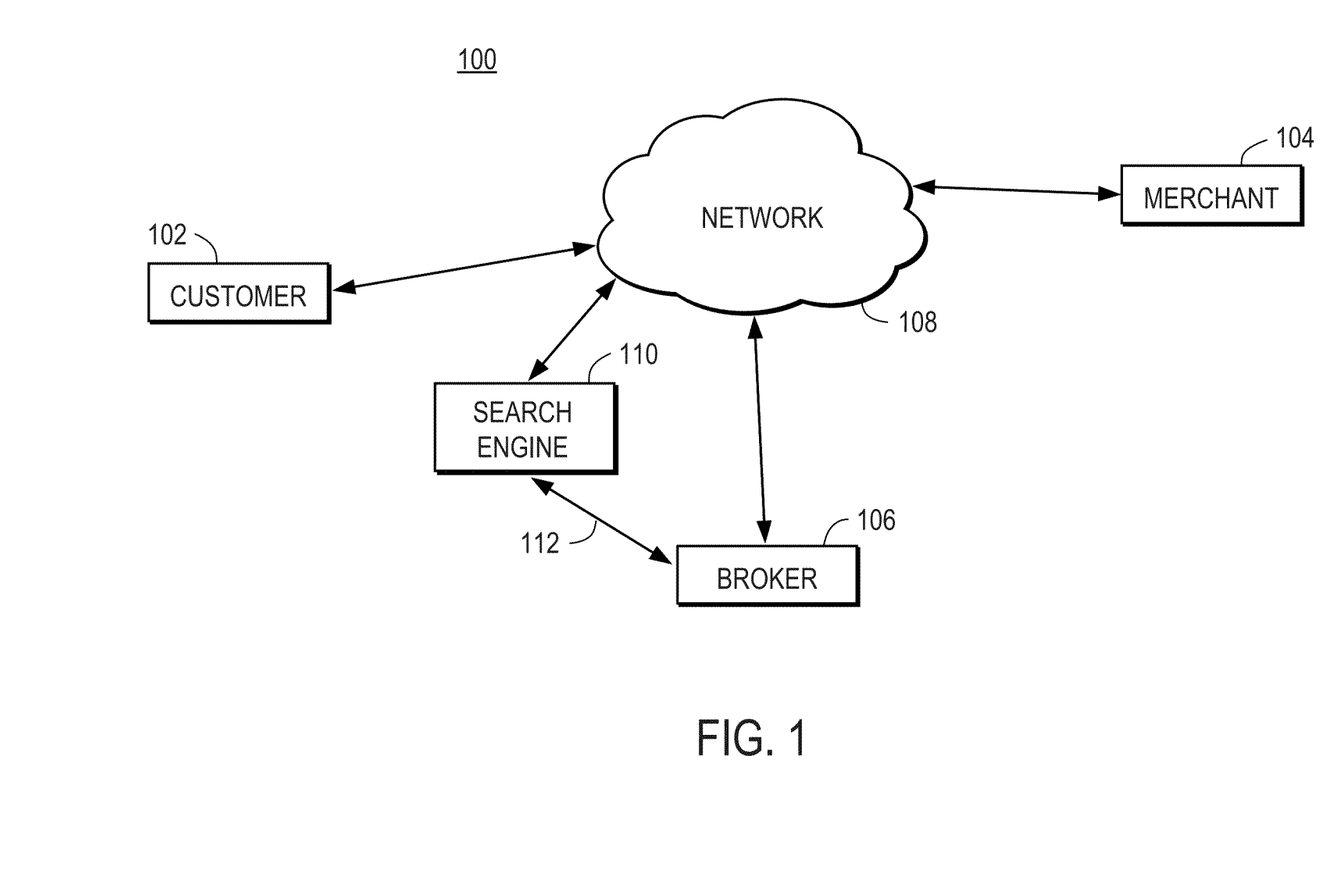
FIG. 1 is a high-level block diagram of a computing environment according to one embodiment.

FIG. 1 is a high-level block diagram of a computing environment 100 according to one embodiment. FIG. 1 illustrates a customer 102, a merchant 104, a broker 106, and a search engine 110 connected by a network 108. In addition, the search engine 110 and the broker 106 are connected by a separate network link 112 that does not necessarily travel over the main network 108.

The customer 102 in this embodiment represents an entity that obtains items via the network 108 through purchases or other types of transactions. The customer 102 is sometimes referred to as the "buyer" and the transaction is sometimes referred to as a "sale" or "purchase." As used herein, these terms also refer to other types of transactions, regardless of whether the customer is technically a "buyer" or the transaction is technically a "sale."

In one embodiment, the customer 102 includes a computer system that is utilized by an end-user to communicate with other computers on the network 108 in order to effect a purchase. The computer system, for example, can be a personal computer executing a web browser such as MICROSOFT INTERNET EXPLORER that allows the end-user to retrieve and display content from web servers and other computer systems on the network 108. In other embodiments, the customer 102 includes a network-capable device other than a computer system, such as a personal digital assistant (PDA), a cellular telephone, a pager, a television "set-top box" etc. Although FIG. 1 illustrates only a single customer 102, embodiments can have thousands or millions of customers participating in the electronic commerce system described herein. The single customer 102 is illustrated in order to simplify and clarify the present description. As used herein, the reference number 102 refers to both a single customer and/or a set of customers, depending upon the context.

Similarly, the merchant 104 represents an entity that sells items on the network 108 or makes items available through types of transactions. The merchant 104 offering the item to the buyer is sometimes referred to as the "seller" and the transaction is sometimes referred to as a "sale" or "purchase." As used herein, these terms also refer to other types of transactions, regardless of whether the merchant is technically a "seller" or the transaction is technically a "sale."

In one embodiment, the merchant 104 includes a computer system acting as a web server that is utilized to offer the items to potential customers 102. The items offered by the merchant 104 can include tangible items such as books, CDs, DVDs, digital cameras and other types of electronic goods, etc. The items offered by the merchant 104 can also include intangible items such as services and electronic content such as web pages, downloadable files, streaming media, etc. Although FIG. 1 illustrates only a single merchant 104, embodiments can have many merchants participating in the electronic commerce system. The single merchant 104 is illustrated in order to simplify and clarify the present description. As used herein, the reference number 104 refers to both a single merchant and/or a set of merchants, depending upon the context.

The broker 106 represents an entity that serves as an intermediary for the transaction between the customer 102 and the merchant 104. In one embodiment, the broker 106 operates an electronic commerce system that functions as a centralized place that the customers 102 can use to pay for items offered by the merchants. Thus, the customers 102 can patronize multiple merchants 104 while providing their payment information to only the broker 106. Although FIG. 1 illustrates only a single broker 106, embodiments can have multiple brokers participating in the electronic commerce system. In one embodiment, the broker 106 is said to be "remote" from the customer 102 and/or merchant 104. "Remote" in this context means that the broker is logically separate from the customer and/or merchant, and does not necessarily refer to a physical distance between the entities.

The search engine 110 represents an entity that allows the customer 102 to search for merchants 104, items provided by the merchants, and/or other content on the network 108. The search engine 110 is used, for example, by customers 102 seeking items that can be purchased from merchants 104 using the broker 106. In one embodiment, the search engine 110 is provided by GOOGLE INC. of Mountain View, Calif.

In one embodiment, the search engine 110 receives a search query from the customer 102 and generates a set of search results in response. The search results describe content available on the network 108 that satisfy the query. The content can include paid advertisements and references to web pages, images, video, and other electronic data on the network 108 related to the query. Some of the content is associated with merchants. Ads that advertise a merchant or items sold by the merchant are examples of content associated with merchants. Likewise, a web page from a web site operated by a merchant is another example of content associated with a merchant.

In one embodiment, the search engine 110 communicates with the broker 106 via the network 108 and/or the separate communication link 112 to identify search result content associated with merchants that support purchases through the broker 106. The results of a typical search can include some content associated with merchants 104 that support purchases through the broker 106, some content associated with merchants that do not support purchases through the broker, and some content not associated with any merchant. An embodiment of the search engine 110 visually distinguishes content in the search results associated with merchants 104 that support purchases through the broker by displaying a badge, such as a graphical icon, adjacent to content. Other embodiments distinguish the content using different types of badges, and/or using different techniques, such as displaying the badge as a textual message adjacent to the content or displaying the content in a special region of the web page containing the search results. Further, one embodiment of the search engine 110 utilizes different types of badges to indicate different information about different merchants.

Figure 7:
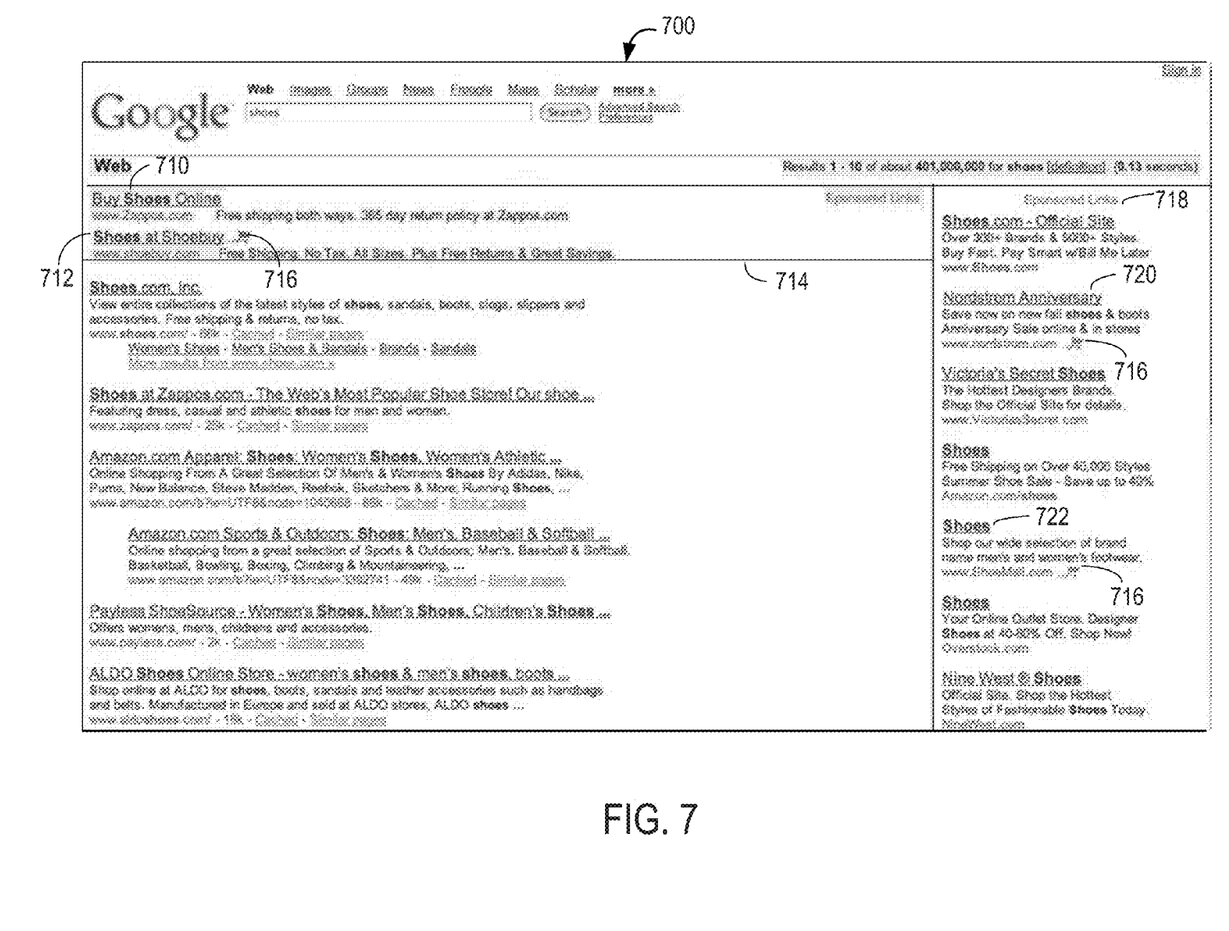
FIG. 7 is an example of a web page showing search results based on the query "shoes" according to one embodiment.

For example, if the customer 102 provides the search query "shoes" the search engine 110 identifies a set of content related to shoes and returns references to the content on a web page (and/or as another representation). FIG. 7 is an example of a web page 700 showing search results based on the query "shoes." In this example, the first two items of returned content are ads 710 and 712 in a "Sponsored Links" box 714 from merchants 104 that sell shoes or related items. In this case, only the merchant of ad 712 in the Sponsored Links box 714 uses the broker payment system. Accordingly, the search engine 110 displays a badge 716 adjacent to ad 712. In this example, the badge is a shopping cart icon. In addition, the search results include ads in a "Sponsored Links" box 718 on the right side of the web page 700 from merchants that sell shoes or related items. Two of the ads 720, 722 in this box 718 support the broker payment system. Accordingly, the web page displays the badge 716 adjacent to ads 720 and 722. Further, the web page displays content from web pages on the network 108 that satisfy the search query.

The network 108 represents the communication pathways between the customer 102, merchant 104, and broker 106. In one embodiment, the network 108 is the Internet. The network 108 can also utilize dedicated or private communications links that are not necessarily part of the Internet. In one embodiment, the network 108 uses standard communications technologies and/or protocols. Thus, the network 108 can include links using technologies such as Ethernet, 802.11, integrated services digital network (ISDN), digital subscriber line (DSL), asynchronous transfer mode (ATM), etc. Similarly, the networking protocols used on the network 108 can include the transmission control protocol/Internet protocol (TCP/IP), the hypertext transport protocol (HTTP), the simple mail transfer protocol (SMTP), the file transfer protocol (FTP), etc. The data exchanged over the network 108 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

II. System Architecture

Figure 2:
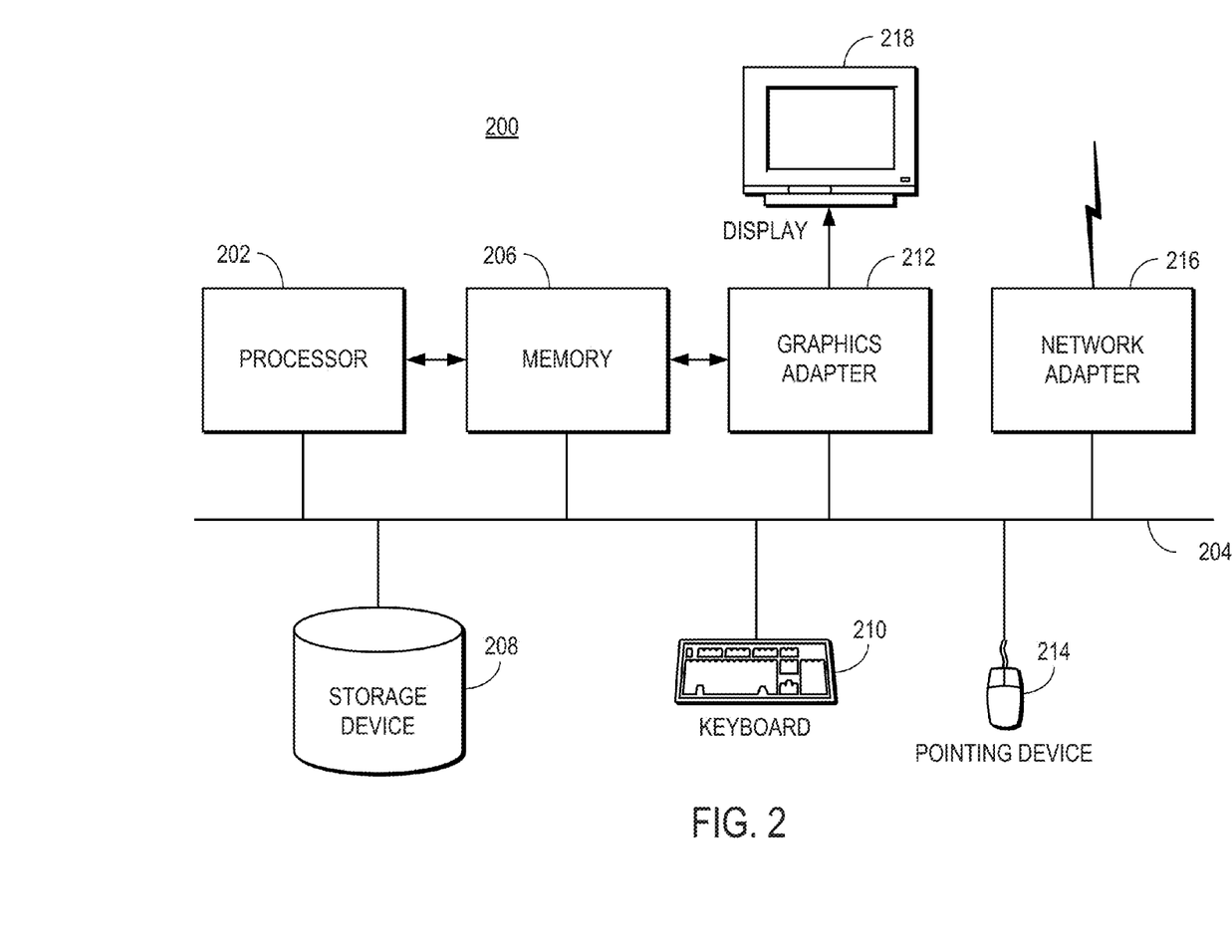
FIG. 2 is a high-level block diagram illustrating a functional view of a typical computer system for use as one of the entities illustrated in the environment of FIG. 1 according to an embodiment.

FIG. 2 is a high-level block diagram illustrating a functional view of a typical computer system 200 for use as one of the entities illustrated in the environment 100 of FIG. 1 according to an embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108.

As is known in the art, the computer system 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, the customer 102 typically requires less processing power than the merchant 104 and broker 106. Thus, the customer computer system can be a standard personal computer system. The merchant and broker computer systems, in contrast, may comprise more powerful computers and/or multiple computers working together to provide the functionality described herein.

Figure 3:
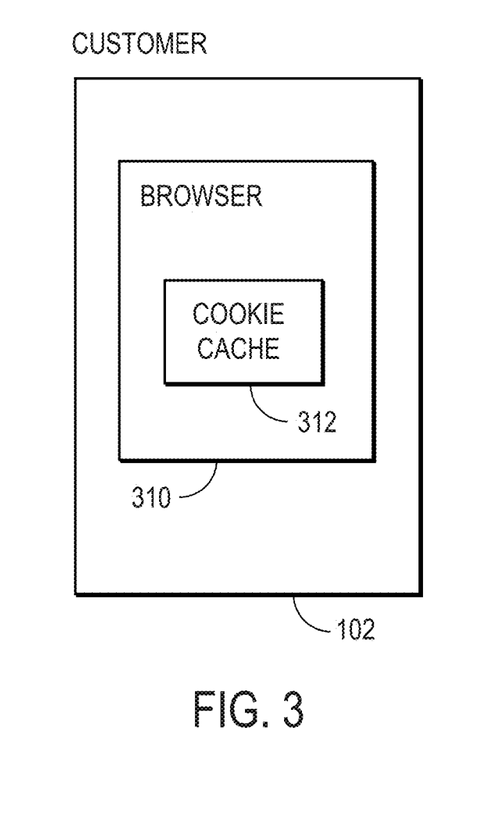
FIG. 3 is a high-level block diagram illustrating modules within a customer according to one embodiment.

FIG. 3 is a high-level block diagram illustrating modules within a customer 102 according to one embodiment. Those of skill in the art will recognize that other embodiments can have different and/or other modules than the ones described here, and that the functionalities can be distributed among the modules in a different manner.

As shown in FIG. 3, the customer 102 includes a browser module 310 that allows the customer to view web pages provided by the merchant 104, broker 106, and/or other entities on the network 108. In one embodiment, the browser module 310 is a conventional web browser, such as MICROSOFT INTERNET EXPLORER or MOZILLA FIREFOX. In one embodiment, the browser module 310 maintains a cookie cache 312 that stores cookies associated with web sites on the network 108. The merchant 104 and broker 106 can communicate with the browser module 310 and instruct it to create a cookie in the cookie cache 312 holding certain information. The browser module 310 provides the cookie to the merchant 104 and/or broker 106 when the browser connects to the site that created it.

Figure 4:
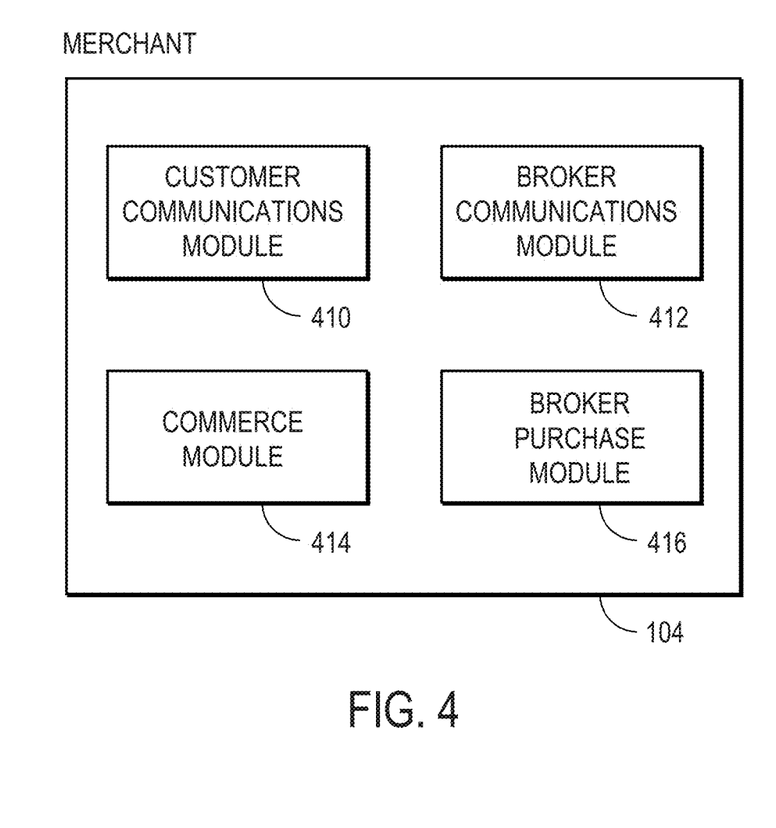
FIG. 4 is a high-level block diagram illustrating modules within a merchant according to one embodiment.

FIG. 4 is a high-level block diagram illustrating modules within a merchant 104 according to one embodiment. Those of skill in the art will recognize that other embodiments can have different and/or other modules than the ones described here, and that the functionalities can be distributed among the modules in a different manner.

A customer communications module 410 communicates with the customer 102 via the network 108. In one embodiment, the customer communications module 410 includes a web server that provides web pages to the customer 102 and receives end-user input sent over the network 108 by the customer's browser module 310. The customer communications module 410 thus allows a customer to navigate the merchant's web site.

In one embodiment, a broker communications module 412 communicates with the broker 106 via the network 108. In one embodiment, merchant-broker communications are conducted using the web services description language (WSDL). In one embodiment, the broker communications module 412 uses WSDL to describe the services it provides and ascertain the services provided by the broker 106. The broker communications module 412 uses XML-based remote procedure calls (RPCs) to provide information to the broker 106 and receive information in return. In other embodiments, the broker communications module 412 communicates with the broker 106 using other techniques and/or protocols, such as via email messages, HTML web pages intended for review by human users, proprietary communications protocols, etc.

In one embodiment, the merchant 104 uses the broker communications module 412 to send the broker 106 one or more business URLs utilized by the merchant. The business URL references the domain name of the web site utilized by the merchant 104 to conduct business on the network 108. For example, the business URL can be "www.mystore.com." The business URL is utilized by the broker 106 and/or search engine 110 to evaluate whether to display a badge in association with search results that reference the merchant 104.

A commerce module 414 operates in tandem with the customer communications module 410 and allows the customer 102 to engage in electronic commerce transactions with the merchant 104. In general, the commerce module 414 allows the merchant 104 to create and manage a catalog of items available for sale. The customer 102 can browse the catalog and indicate items that the customer 102 desires to purchase. In one embodiment, the commerce module 414 utilizes a shopping cart metaphor where items selected by the customer 102 are placed in a virtual shopping cart. The customer can "checkout" and purchase the items in the shopping cart. In one embodiment, the commerce module 414 includes functionality from the open source osCommerce package.

The commerce module 414 provides the customer 102 with one or more payment options at the time of checkout. For example, one payment option can allow the customer 102 to provide payment information directly to the merchant 104. Another payment option can reference an alternative payment system, such as the payment system provided by the broker 106. This latter option may be more desirable to the customer 102 when, for example, the merchant 104 is not well known and the customer is reluctant to provide the payment information to the merchant. The broker 106, on the other hand, may be well known to the customer 102 and an entity to which the customer 102 is comfortable providing payment information. In one embodiment, the commerce module 414 provides a graphic, slogan, and/or other indicia that represents the broker 106 and is designed to convey a sense of trustworthiness to the customer 102.

A broker purchase module 416 interacts with the broker communications module 412 to effect a customer purchase. The broker purchase module 416 is activated if a customer 102 selects the broker payment system for a purchase. In one embodiment, the broker purchase module 416 generates a description of the customer's shopping cart. In one embodiment, the description is encoded in XML, although other techniques can also be used. The description describes the items in the cart, including the type and number of items purchased, and the prices of the items. In one embodiment, the shopping cart description also includes shipping rules describing shipping options and/or rates for the items in the cart, taxation rules applicable to the items, a merchant ID that uniquely identifies the merchant 104, and/or a transaction ID that uniquely identifies the specific purchase transaction. The shopping cart description can also include anticipated shipping dates and/or order processing times. The broker purchase module 416 digitally signs the shopping cart description to prevent third parties from making modifications to it.

In one embodiment, the broker purchase module 416 utilizes the broker communications module 412 to send the shopping cart description to the broker 106. In another embodiment, the broker purchase module 416 uses the customer communications module 410 to provide the shopping cart description to the customer 102 and direct the customer's browser module 310 to send it to the broker 106. The broker purchase module 416 can perform this latter task by, for example, by using a HTTP GET method that codes the shopping cart description into a uniform resource locator (URL) that references the broker 106, and redirecting the customer's browser 310 to the coded URL. In another example, the broker purchase module 416 can use a HTTP POST method that codes the shopping cart description into the body of a request made from the customer's browser 110 to the broker 106.

Figure 5:
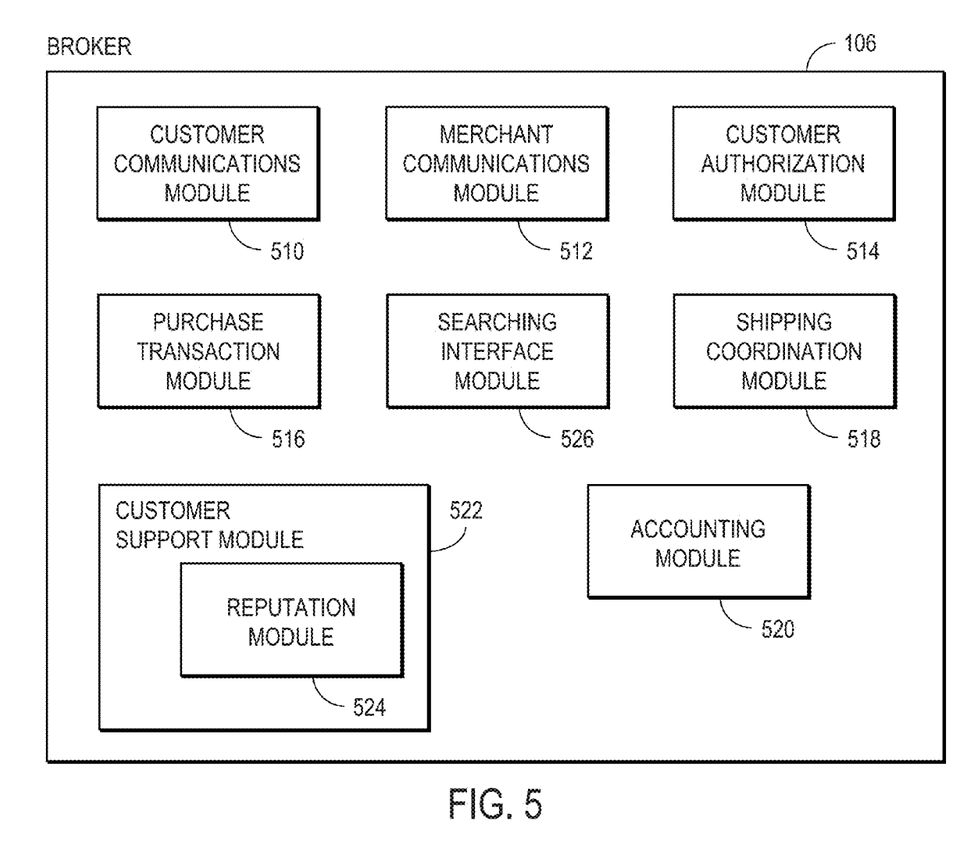
FIG. 5 is a high-level block diagram illustrating modules within the broker according to one embodiment.

FIG. 5 is a high-level block diagram illustrating modules within the broker 106 according to one embodiment. Those of skill in the art will recognize that other embodiments can have different and/or other modules than the ones described here, and that the functionalities can be distributed among the modules in a different manner.

The broker includes a customer communications module 510 and a merchant communications module 512 for respectively communicating with the customer 102 and the merchant 104. In one embodiment, these modules are functionally equivalent to the customer and broker communications modules in the merchant 104.

A customer authorization module 514 authenticates and authorizes customers 102 seeking to use the broker 106 for purchases. In one embodiment, the customer authorization module 514 maintains an ID, password, and/or other information for each customer 102. The customer 102 supplies the correct information in order to identify and authenticate itself. In general, when a customer 102 contacts the broker 106 to make a purchase, the customer's relationship with the broker fits into one of three categories: new customer, existing customer that has not been active recently, or existing active customer. In one embodiment, the customer authorization module 514 determines the category of the customer 102 and responds accordingly.

If the customer 102 is new, an embodiment of the customer authorization module 514 presents the customer with one or more web pages that allow the customer to create an account and select an ID, password and/or other identifying information. In one embodiment, the customer 102 also supplies payment information specifying a charge account and/or creating a stored value. The payment information can include, for example, a credit card number or a gift certificate identifier. The customer can also supply information including mailing/shipping addresses and settings for miscellaneous preferences.

If the customer 102 already has an account but has not been active recently (e.g., within the previous 10 minutes), in one embodiment the customer authorization module 514 provides the customer with the standard login prompt and thereby allows the customer to log into the broker 106. If the customer 102 has been active recently, one embodiment of the customer authorization module 514 allows the customer to directly access the broker 106 without additional authentication procedures. After each successful login, one embodiment of the customer authorization module 514 places a cookie in the customer's browser module 310 that identifies the customer and indicates the time of the customer's last login. In another embodiment, the cookie identifies the expiration date/time after which the customer's activity is no longer considered "recent." The cookie thus allows the customer authorization module 514 to determine the customer's status with respect to the broker 106 and respond appropriately.

A purchase transaction module 516 receives the shopping cart description and allows the customer 102 to complete the purchase transaction for the items in the cart. In one embodiment, the purchase transaction module 516 presents the customer 102 with web pages that describe the items in the cart and allow the customer to specify the methods of payment and shipping, along with any other details that are necessary and/or desired for the transaction. The purchase transaction module 516 uses the shipping address specified by the customer 102 and the shipping rules received from the merchant to calculate the rates for the shipping options. Similarly, the purchase transaction module 516 uses the shipping address and taxation rules from the merchant 104 to calculate any taxes on the purchase. The purchase transaction module 516 determines the total cost of the purchase, charges the customer 102, and provides the customer with a receipt.

A shipping coordination module 518 interacts with the merchant 104 to inform the merchant of the purchase and coordinate shipping of the purchased items to the customer 102. In one embodiment, the shipping coordination module 518 provides the customer-indicated shipping address and shipping options to the merchant 102. In another embodiment, the shipping coordination module 518 instructs the merchant to ship the items to a placeholder or third-party address. In this latter embodiment, the broker 106 electronically notifies the carrier (e.g., Federal Express or United Parcel Service) to redirect the package to the customer's true shipping address. This embodiment thus keeps the customer 102 completely anonymous to the merchant 104.

An accounting module 520 monitors the transactions that occur using the broker 106, invoices the customers 102, and credits the merchants 104. In a typical case, the accounting module 520 charges the customer's credit card or other method of payment and credits the merchant's account for the amount of the purchase. In another embodiment, the accounting module 520 aggregates purchases made by the customers and then periodically credits each merchant for the value of the purchases made within the time period. In yet another embodiment, the accounting module 520 aggregates a customer's purchases within a given time period and then charges the customer's account once for aggregate total of the purchases. This latter embodiment might be desirable where, for example, the customer 102 makes many small purchases.

A customer support module 522 allows customers 102 to request refunds and/or perform other customer-support related tasks. In one embodiment, the broker 106 provides a satisfaction guarantee and allows customers to obtain refunds on purchases with relative ease. This refund policy provides the customers 102 with added security and may make the customers more willing to purchase items from relatively unknown and/or untrustworthy merchants 104.

In one embodiment, the customer support module 522 includes a reputation module 524 that monitors transactions performed by the broker and calculates reputation scores for the customers 102 and/or merchants 104. In one embodiment, the reputation module 524 calculates a volume rating that indicates the percentage of transactions for which a customer has requested a refund or otherwise disputed. Similarly, in one embodiment the reputation module 524 calculates an amount rating that indicates the cash value of a customer's disputed transactions as a percentage of the customer's total transactions. In another embodiment, the reputation module 524 calculates the percentages of merchants' sales that are disputed by the customers 102. In one embodiment the reputation scores are used to detect potential fraud.

A searching interface module 526 interfaces with the search engine 110. In one embodiment, the searching interface module 526 interacts with the search engine 110 to allow the search engine to identify content from merchants 104 that support transactions using the broker 106. In one embodiment, the searching interface module 526 provides the search engine 110 with the business URLs of merchants 104 that use the broker. In another embodiment, the searching interface module 526 receives a list of merchants 104 from the search engine 110 and compares the list to the business URLs to identify merchants that use the broker 106.

Figure 8:
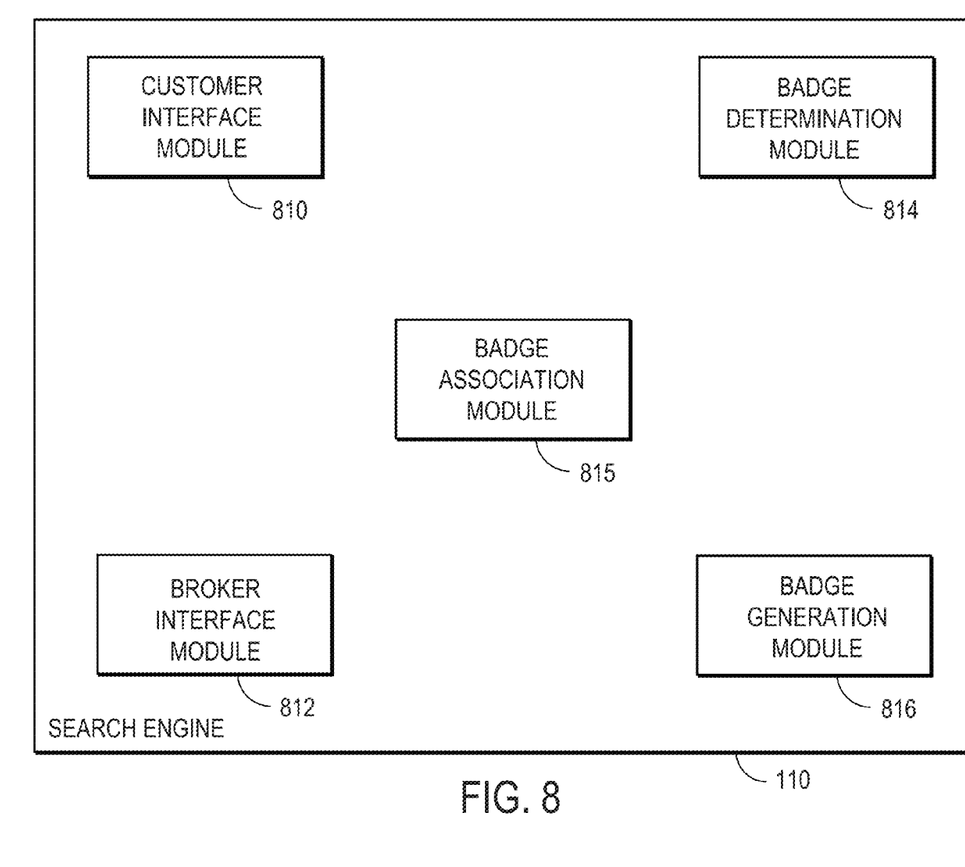
FIG. 8 is a high-level block diagram illustrating modules within the search engine according to one embodiment.

FIG. 8 is a high-level block diagram illustrating modules within the search engine 110 according to one embodiment. Those of skill in the art will recognize that other embodiments can have different and/or other modules than the ones described here, and that the functionalities can be distributed among the modules in a different manner.

A customer interface module 810 interacts with a customer 102 and/or other entity that executes a search query. The customer interface module 810 receives a search query and provides search results that satisfy the query in response. In one embodiment, the customer 102 provides the search engine 110 with an explicit search query that specifies search parameters such as keywords, meta-data describing desired results, and/or other information.

In another embodiment, the search query received by the customer interface module 810 is generated implicitly based on actions performed by the customer 102 and/or other criteria. For example, the customer 102 can request a web page from a web site participating in an advertising program such as ADSENSE from GOOGLE INC. of Mountain View, Calif. The web page includes ads and/or other content that are selected dynamically based on the content of the web page, the geographic location of the customer 102, and/or other criteria. In one embodiment, the web page includes code that causes the customer's web browser 310 to generate a query for the ads. In another embodiment, the web site that serves the page generates the query for the ads. The customer interface module 810 receives the query for the ads.

The search engine 110 returns search results in response to the query received by the customer interface module 810. The search results can include references to web pages containing content that at least partially satisfies the query. Likewise, the search results can include ads selected based on the query, on the content of a web page referenced by the query, and/or based on other criteria as mentioned above. In addition, the search results can include a mix of web pages references, ads, and/or other content. In one embodiment, the customer interface module 810 uses browser cookies and/or other techniques to track the queries entered by the specific customers and the actions taken by the customers upon viewing the search results.

A broker interface module 812 interacts with the broker 106. In one embodiment, the broker interface module 812 receives from the broker 106 the business URLs of merchants that use the broker payment system. In one embodiment, the broker interface module 812 sends a list of merchants with which search result content is associated to the broker 106. In response, the broker 106 sends the broker interface module 812 data identifying the merchants that use the broker payment system. Further, in one embodiment, the broker interface module 812 receives from the broker 106 signals describing characteristics of the merchants. These characteristics for a merchant can include, for example, one or more of: merchant reputation scores; the merchant's conversion rate (i.e., how many customer selections of a merchant ad result in a sale); locations of customers that tend to patronize the merchant; dates and times during which merchants tend to have greater sales; the average number of orders processed by the merchant per day; and/or the number of canceled orders, returns, and/or chargebacks by the merchant.

A badge determination module 814 determines whether a badge should be displayed in association with content in the search results. In one embodiment, the badge determination module 814 compares a URL associated with content with the business URLs of merchants that use the broker payment system. If the URL associated with the content contains a business URL, a badge is displayed with the content in the search results.

In one embodiment, an advertiser that provides an ad to display as a search result specifies a visible URL and a destination URL. The visible URL is what shows in the ad, but the destination URL is a network location to which the customer 102 is taken when he clicks on the ad. The visible and destination URLs are often different. For example, the ad may be for a specific product, rather than the merchant's whole site. The merchant 104 placing the ad may want the merchant's site URL to show in the ad, but want to take the customer 102 to a page for a specific product when he clicks on the ad. For example, the visible URL may be "www.mystore.com," but the destination URL may be "products.mystore.com/store/products?item=57294322" or something similar.

Another reason the visible and destination URLs might be different is that the ad might be purchased by an affiliate of the merchant 104. The affiliate may ultimately be delivering the customer 102 to the merchant's site, and thus specify the merchant's URL as visible. However, the affiliate might first take the customer 102 to the affiliate's site before referring the customer to the merchant's site. Therefore, the destination URL might be something like: clicks.affiliate.com/click?source=adwords?dest=www.mystore.com.

In one embodiment, the badge determination module 814 determines whether to badge an ad returned as a search result based on the visible URL. If the visible URL of an ad and/or other content includes a business address provided by a merchant using the broker payment system, the badge determination module 814 determines that a badge should be displayed with the content in the search results.

A badge association module 815 decides the type of badge that will be associated with the content in the search results once the badge determination module 814 has determined a badge should be displayed. In one embodiment, the type of badge that is associated with the content is based on characteristics provided to the badge association module 815 by the customer interface module 810 and/or the broker 106.

In one embodiment, the badge association module 815 associates different types of badges with content from different merchants (as identified by the visible URL) based on the characteristics of the customers 102, merchants 104 and/or other criteria. There are multiple levels of badges, with the first level indicating that the merchant 104 uses the broker payment system and subsequent levels indicating the likelihood that the customer 102 will have a successful buying experience. In one embodiment the particular level selected for a merchant can depend on the signals received from the broker 106 that describe characteristics of the merchants. In other embodiments, the badge association module 815 uses customer-based criteria (received from the customer 102 and/or broker) to select the badge or badges to show. For example, the customer's purchase history can be analyzed in order to select badges based on the likelihood that the customer 102 will purchase an item from the merchant 104.

In one embodiment, whether to associate a badge at all, and/or the level of badge selected by the badge association module 815 is query dependent. In one embodiment, the badge association module 815 decides the level of badge to associate with content from a merchant based on knowledge that a certain query results in a high conversion rate with that particular merchant. The badge association module 815 shows a higher-level badge only when the query is the one that produces the higher conversion rate, and shows a lower-level badge for other queries. For example, for the merchant Sport Jackets, if there is a high conversion rate for the query "sport jacket," then the merchant would get a high-level badge. On the other hand, if there is a low conversion rate for the query "jacket," the same merchant, Sport Jackets, would receive a low-level badge. In certain circumstances, such as when a query produces very low conversion rates for a merchant, the badge association module 815 may omit the badge from the content associated with the merchant. Further, in one embodiment, the level of badge associated with content from a merchant by the badge association module 815 is based on combinations of merchant, customer, and/or query criteria.

In sum, the badge association module 815 can utilize a variety of different criteria to select the badge to display, or even whether to display a badge at all. The badge association module 815 can analyze the criteria dynamically, at the time the search results are being provided to the customer 102. Therefore, the badges provide the customer 102 with accurate information as to whether the customer is likely to have a successful purchasing experience.

A badge generation module 816 generates badges for content in the search results. In one embodiment, badge association module 815 provides the badge generation module 816 with the information on the type of badge or badges to generate for the content in the search results. In one embodiment, the first-level badge created by the badge generation module 816 is an icon such as a shopping cart that is displayed adjacent to the content in the search results. The second-level badge created by the badge generation module 816 is an icon such as a star. Other embodiments use other icons and/or indicators.

Figure 10:
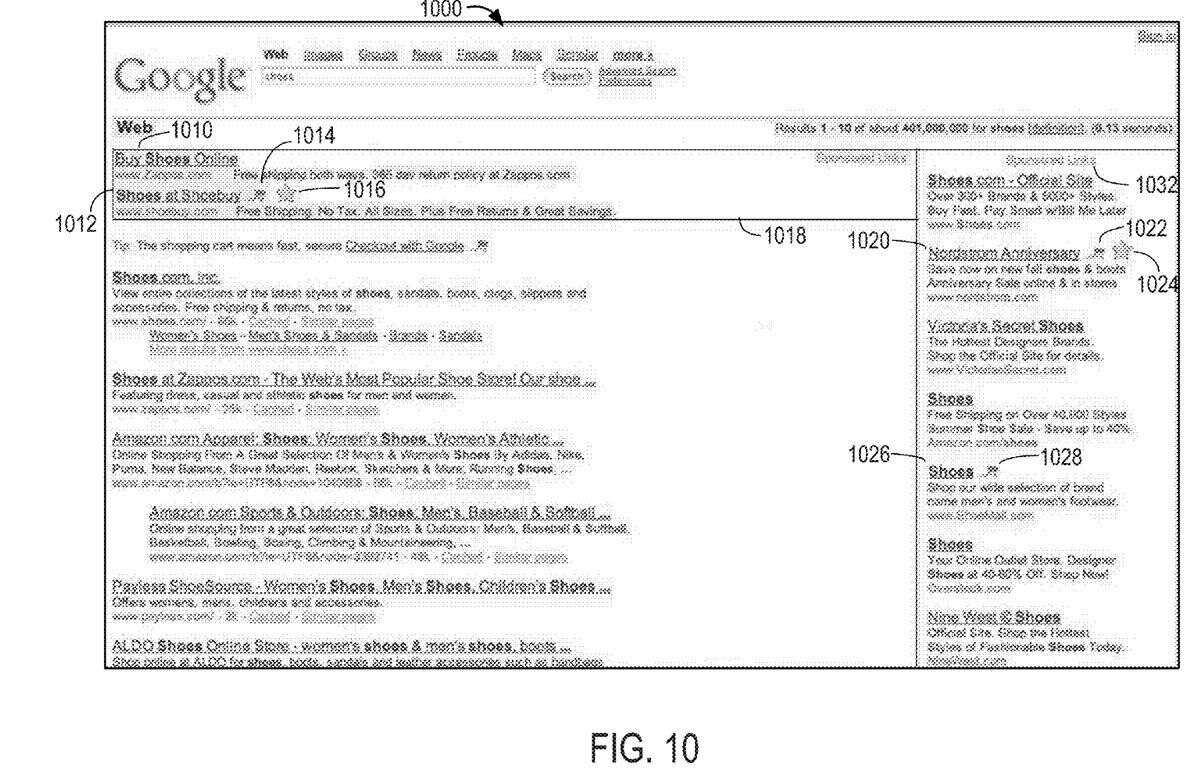
FIG. 10 is an example of a web page showing the multilevel badging associated with the search results of the query "shoes" according to one embodiment.

FIG. 10 is an example of a web page showing the multilevel badging associated with search results for the query "shoes" according to one embodiment. In this example, the first two items of returned content are ads 1010, 1012 in a "Sponsored Links" box 1018 from merchants 104 that sell shoes or related items. In this case, only the merchant with ad 1012 in the Sponsored Links box 1018 uses the broker payment system. Accordingly, the search engine 110 displays a first level badge 1014 adjacent to ad 1012. In this example, the first level badge 1014 is a shopping cart icon. In addition, since the merchant accepts the broker payment system and because the badge association module 815 predicts that the customer 102 will be satisfied with the buying experience provided by the merchant, a second level badge 1016 is displayed next to ad 1012. In this example, a star is used as the second badge 1016. Additionally, the search results include ads in a "Sponsored Links" box 1032 on the right side of the web page 1000 from merchants that sell shoes or related items. The ads 1020 and 1026 in box 1032 support the broker payment system, which is why the shopping cart badges 1022 and 1028 are displayed next to the ads. Badge 1024 shows the second badge for ad 1020, but there is no second badge for ad 1026. The reason there is not a second badge even though the merchant of ad 1026 accepts the broker payment system is because the customer will more than likely not have a successful shopping experience with that merchant. Further, the web page displays content from web pages on the network 108 that satisfy the search query. The badges used in FIG. 10 are just one embodiment of the type of indicators that can be used; other embodiments may use other icons and/or indicators.

III. Process/Example

Figure 6:
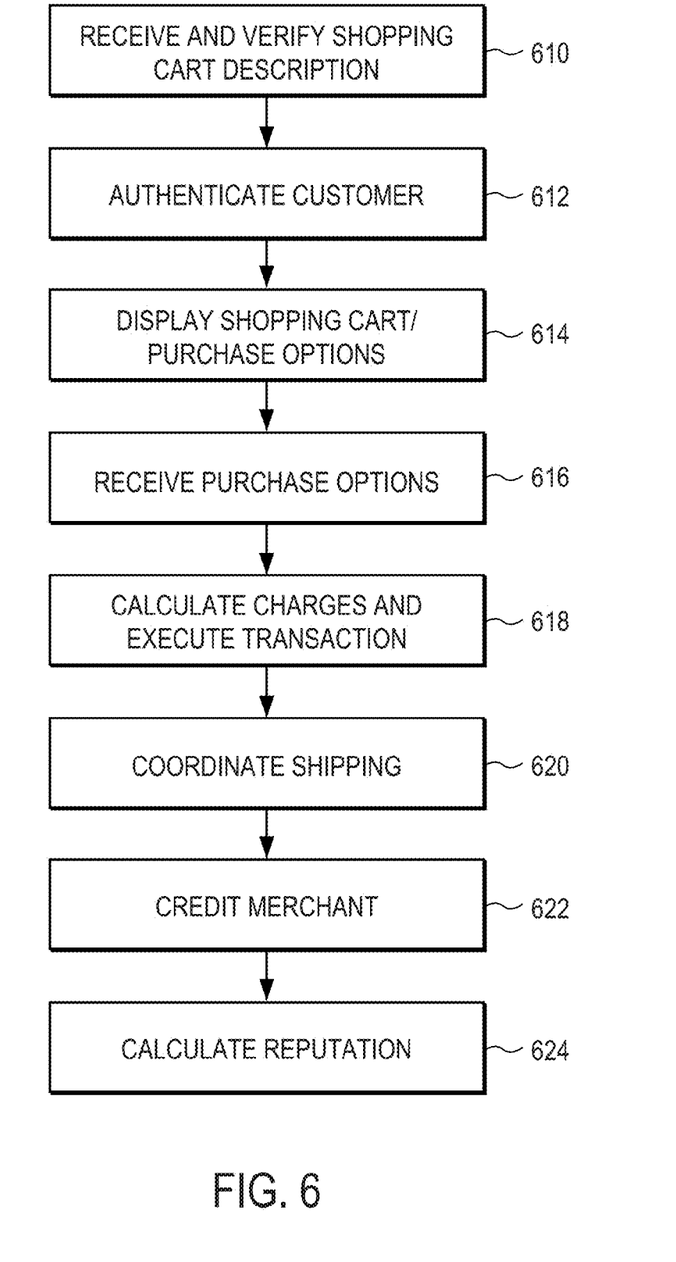
FIG. 6 is a flow chart illustrating the operation of the broker according to one embodiment.

FIG. 6 is a flow chart illustrating the operation of the broker 106 according to one embodiment. Those of skill in the art will recognize that other embodiments can perform the steps of FIG. 6 in different orders. Moreover, other embodiments can include different and/or additional steps than the ones described here.

FIG. 6 illustrates steps performed by the broker 106 in an exemplary transaction where a customer 102 is purchasing an item from a merchant 104. Assume for purposes of this example that the customer 102 uses a web browser to browse the merchant's web site, and selects one or more items to purchase. The merchant 104 places the items in a virtual shopping cart, and offers the customer 102 the option to checkout using the broker 106. The customer 102 selects this option and is directed by the merchant 104 to a broker web site.

The broker 106 receives and verifies 610 the shopping cart description. In one embodiment the broker 106 receives the shopping cart description from the customer 102 as part of a URL or request. In another embodiment, the broker 106 receives the shopping cart description directly from the merchant 104. The broker 106 verifies the shopping cart description by, for example, verifying a digital signature of the merchant 104.

The broker 106 authenticates 612 the customer 102. This step can occur, for example, by asking the customer for an ID, password and/or other identifying information, reading a cookie provided by the customer's browser 310, and/or through another technique. The broker 106 displays 614 a representation of the shopping cart to the customer 102. The broker 106 also displays 614 web page buttons or another interface that the customer 102 uses to select purchase options, such as a shipping method and address. These purchase options are derived in part from data included in the shopping cart description. The customer 102 selects the desired options, and the broker receives 616 the selections from the customer's browser 310.

The broker 106 uses the purchase options selected by the customer 102 to calculate 618 the total charge for the transaction. These calculations typically take into account the cost of the items in the cart, shipping method selected by the customer 102, applicable taxes, and/or any other charges described by the merchant 104 in the shopping cart description. The broker 106 executes 618 the transaction by charging the customer's credit card, subtracting a value from a stored value account, and/or performing an equivalent action.

The broker 106 coordinates 620 shipping with the merchant 104. In one embodiment, the broker 106 supplies the customer-indicated shipping address and method to the merchant 104 and instructs the merchant to ship the purchased items directly to the customer 102. In another embodiment, the broker 106 instructs the merchant to ship the items to a placeholder address. The broker 106 then communicates with the shipper to direct the package containing the items to the customer's shipping address.

The broker 106 credits 622 the merchant 104 for the transaction. In one embodiment, the broker 106 keeps a percentage of the transaction and/or charges the merchant 104 a fee for conducting the transaction. In addition, the broker 106 calculates 624 the reputation of the customer 102 and/or merchant 104 in response to the transaction. The reputation may change based on subsequent events, such as the customer 102 requesting a refund for the transaction.

Figure 9:
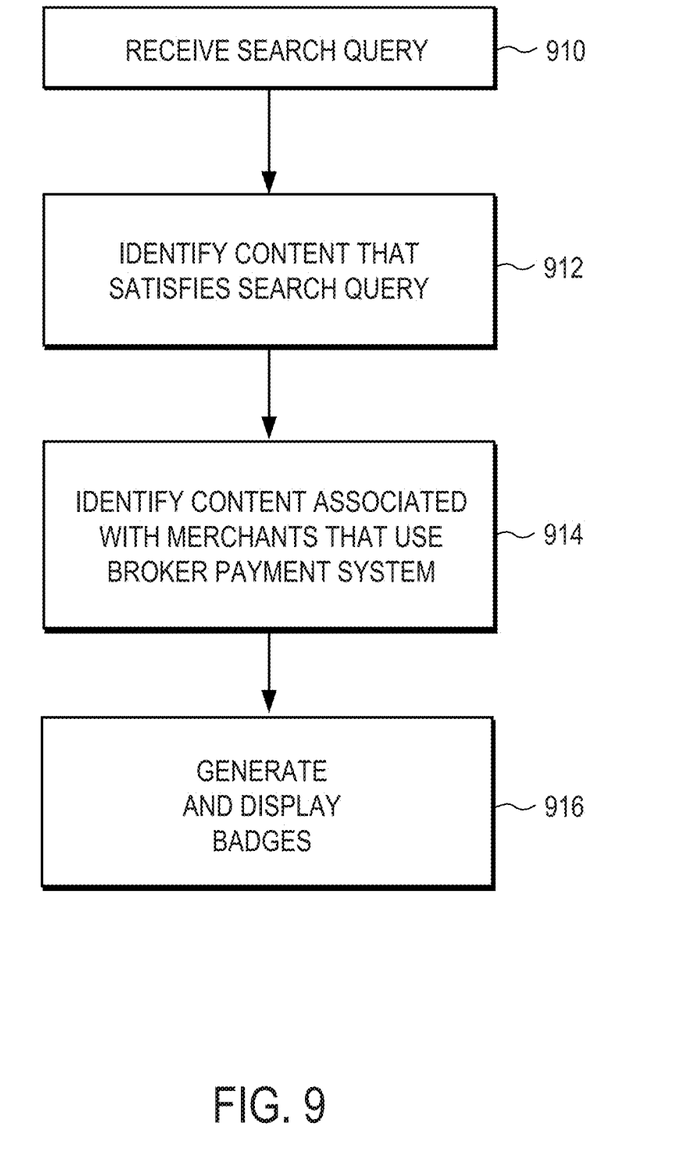
FIG. 9 is a flow chart illustrating the operation of the search engine according to one embodiment.

FIG. 9 is a flow chart illustrating the operation of the search engine 110 according to one embodiment. Those of skill in the art will recognize that other embodiments can perform the steps of FIG. 9 in different orders. Moreover, other embodiments can include different and/or additional steps than the ones described here.

Initially, the search engine 110 receives 910 a search query from a customer 102. The search engine 110 identifies 912 content that satisfies the search query. The content can include, for example, ads from merchants and web pages on the network 108. The search engine 110 determines 914 which content in the search results is associated with merchants that use the broker payment system. In addition, the search engine 110 generates 916 badges for content associated with merchants that use the broker payment system. The particular badge generated for particular content can depend, for example, on the likelihood that the customer 102 will have a successful buying experience with the merchant. The search engine 110 displays 916 the badges on the search results returned to the customer 102.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer system for distinguishing search results, the computer system comprising:
a computer processor; and
a non-transitory computer-readable storage medium having executable computer program instructions to configure the processor to perform operations comprising:
identifying a search result generated responsive to a search query provided by a user;
identifying a merchant associated with the search result;
determining a likelihood that the user will purchase an item from the merchant;
selecting a badge visually indicating the likelihood that the user will purchase an item from the merchant; and
transmitting instructions to generate a display including the selected badge in association with the search result.

2. The computer system of claim 1, wherein determining the likelihood that the user will purchase an item from the merchant comprises:
determining a conversion rate associated with the search query provided by the user;
wherein the badge is selected responsive to the conversion rate.

3. The computer system of claim 2, wherein the conversion rate indicates a number of users that have engaged in a purchase transaction with the merchant responsive to selecting the search result.

4. The computer system of claim 1, wherein determining the likelihood that the user will purchase an item from the merchant comprises:
determining a number of purchase transactions processed by the merchant during a time period;
wherein the badge is selected responsive to the number of purchase transactions processed by the merchant during the time period.

5. The computer system of claim 1, wherein the likelihood that the user will purchase an item from the merchant is based on a purchase history of the user.

6. A computer-implemented method of distinguishing search results, the method comprising:
identifying, by a computer system, a search result generated responsive to a search query provided by a user;
identifying, by the computer system, a merchant associated with the search result;
determining, by the computer system, a likelihood that the user will purchase an item from the merchant;
selecting, by the computer system, a badge visually indicating the likelihood that the user will purchase an item from the merchant; and
transmitting, by the computer system, instructions to generate a display including the selected badge in association with the search result.

7. The method of claim 6, wherein the likelihood that the user will purchase an item from the merchant is determined based on a number of users that have engaged in purchase transactions with the merchant responsive to providing the search query.

8. The method of claim 6, wherein the likelihood that the user will purchase an item from the merchant is determined based on a number of users that have engaged in purchase transactions with the merchant responsive to selecting the search result.

9. The method of claim 6, wherein the likelihood that the user will purchase an item from the merchant is determined based on a reputation score of the merchant.

10. The method of claim 6, wherein the likelihood that the user will purchase an item from the merchant is determined based on a number of purchase transactions processed by the merchant during a time period.

11. The method of claim 6, further comprising:
determining whether the merchant uses an electronic payment system; and
transmitting instructions to include in the display an additional badge in association with the search result, the additional badge visually indicating that the merchant uses the electronic payment system.

12. The method of claim 11, wherein a plurality of merchants use the electronic payment system to perform purchase transactions with customers.

13. The method of claim 6, wherein the search result is an advertisement.

14. The method of claim 6, wherein the search result references a webpage.

15. A non-transitory computer-readable storage medium storing computer-executable code having executable computer program instructions embodied therein for distinguishing search results, the computer program instructions to configure a processor to perform operations comprising:
identifying a search result generated responsive to a search query provided by a user;
identifying a merchant associated with the search result;
determining a likelihood that the user will purchase an item from the merchant;

selecting a badge visually indicating the likelihood that the user will purchase an item from the merchant; and transmitting instructions to generate a display including the selected badge in association with the search result.

16. The non-transitory computer-readable storage medium of claim 15, wherein determining the likelihood that the user will purchase an item from the merchant comprises:

determining a conversion rate associated with the search query provided by the user;

wherein the badge is selected responsive to the conversion rate.

17. The non-transitory computer-readable storage medium of claim 16, wherein the conversion rate indicates a number of users that have engaged in a purchase transaction with the merchant responsive to selecting the search result.

18. The non-transitory computer-readable storage medium of claim 15, wherein determining the likelihood that the user will purchase an item from the merchant comprises:

determining a number of purchase transactions processed by the merchant during a time period;

wherein the badge is selected responsive to the number of purchase transactions processed by the merchant during the time period.

19. The non-transitory computer-readable storage medium of claim 15, wherein the likelihood that the user will purchase an item from the merchant is based on a purchase history of the user.

20. The non-transitory computer-readable storage medium of claim 15, wherein the likelihood that the user will purchase an item from the merchant is based on a reputation score of the merchant.

\* \* \* \* \*